Aug. 21, 1923.

E. N. PAGELSEN

EMERY WHEEL DRESSER

Filed Sept. 9, 1921

1,465,738

INVENTOR.

Edward N. Pagelsen.

Patented Aug. 21, 1923.

1,465,738

UNITED STATES PATENT OFFICE.

EDWARD N. PAGELSEN, OF DETROIT, MICHIGAN, ASSIGNOR TO ROLAND P. PLACE COMPANY, OF MIDLAND, MICHIGAN, A CORPORATION OF MICHIGAN.

EMERY-WHEEL DRESSER.

Application filed September 9, 1921. Serial No. 499,421.

*To all whom it may concern:*

Be it known that I, EDWARD N. PAGELSEN, a citizen of the United States, and residing at Detroit, in the county of Wayne and State of Michigan, have invented new and Improved Emery-Wheel Dressers, of which the following is a specification.

This invention relates to the construction of the holder for the dressing cutter cylinder for truing grinding wheels, and its object is to provide a simple and easily constructed holder which will permit the ready adjustment of the bearings of the cutter cylinder.

This invention consists in the details of construction illustrated in the accompanying drawing and particularly pointed out in the claims.

Figure 1:
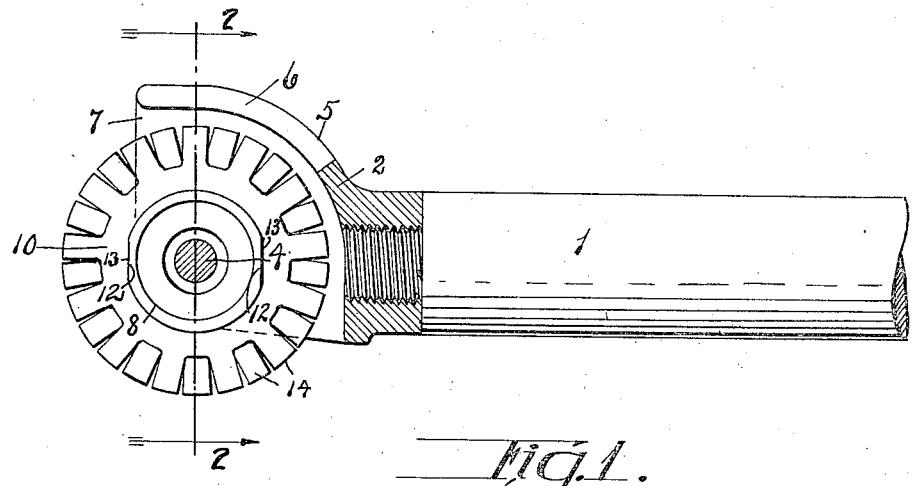
Figures 2, 3:
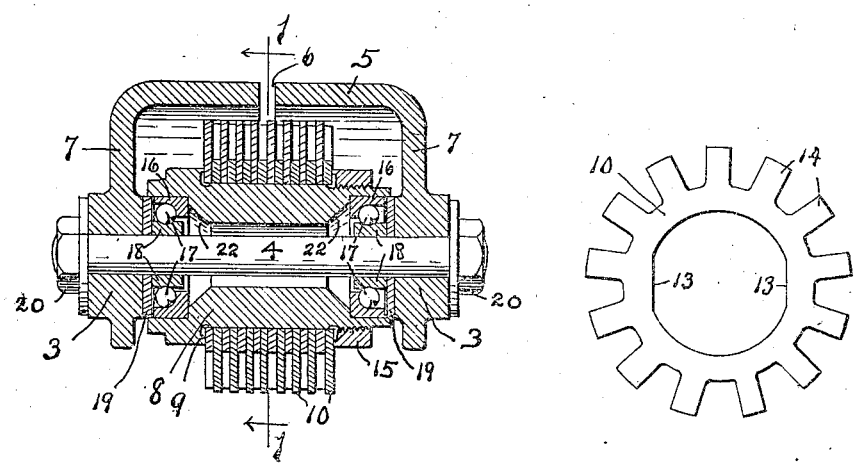

In the drawing, Fig. 1 is a section of this dressing tool on the line 1—1 of Fig. 2, the sleeve and the cutters thereon being in elevation. Fig. 2 is a section on the line 2—2 of Fig. 1. Fig. 3 is an elevation of a cutter disk.

Similar reference characters refer to like parts throughout the several views.

The holder for the cutters consists of a handle or shank 1 and a head 2, formed with approximately parallel and alined hubs 3 for the shaft 4, and a hood 5 which has a narrow slit 6 to permit the hubs 3 and the sides 7 which support these hubs to be forced toward each other. That portion of the body extending between the hubs 3 and receiving the threaded end of the shank 1 may be termed a yoke. When made of good tough cast iron, these hubs may be forced toward each other more than one one-hundredth of an inch for each inch of distance from the center of the shaft 4 to the adjacent wall of the head in alinement with the handle, without damage to the metal. When made of malleable iron or cast steel, then this movement may be much greater.

Mounted within the head is a sleeve 8 having a shoulder 9 against which the cutter disks 10 are positioned. The bearing portion of the sleeve is formed with flats 12 is be engaged by the flat portions 13 of the bore of these disks. These cutters are preferably formed with an uneven number of teeth 14 so that when assembled, the teeth of adjacent cutters alternate, as indicated in Fig. 1. The teeth have parallel sides and are thus of uniform cross section throughout their lengths. The cutters are rigidly held in position by the nut 15. The sleeve, nut and cutters constitute a cutter cylinder.

The sleeve 8 is counterbored at its ends to receive the bearing rings 16 which run on the balls 17, and these in turn run on the inner rings 18 which are tight but slidable on the shaft 4. A washer 19 is rotatably fitted in each counterbore in the ends of the sleeve 8 and prevents the entrance of grit, and these washers bear against the hubs 3 and the bearing rings 18. The hubs are drawn toward each other by the nuts 20 on the ends of the shaft 4.

The inner ends of the hubs 3 are milled with great accuracy and the length of the sleeve 8 with its bearings and the washers 19 is made substantially as great as possible and still permit them to be positioned. Thereafter the shaft 4 is introduced and the nuts 20 screwed up until the hubs 3 are drawn toward each other sufficiently to properly adjust the bearings through pressure on the washers 19.

It will be noticed that the bearing faces of the shoulder 9 and of the nut 15 are relieved so as to cause the pressure of these two to be exerted along their peripheries. This avoids the danger of a firm grip on the cutter disks being lost through the presence of small fins along the edges of the holes in these cutters.

When the cutters are worn out they may be replaced by taking out the bolt 4, removing the sleeve and taking off the nut 15. New sets of cutter disks are supplied properly assembled and tied together by a wire wrapping so they may be mounted on the sleeve with least loss of time. Should an outer bearing ring 16 become injured it can readily be removed by driving it out by means of a curved tool, the conical bores 22 of the sleeve 8 readily permitting this operation.

The proportions and the details of the several parts of this dressing tool may all be changed by those skilled in the art without departing from the spirit of my invention as set forth in the following claims.

I claim:—

1. In a dressing tool, a head having alined hubs, sides attached to the hubs and a curved hood attached to the sides and provided with a slit at right angles to the line of the hubs, a stem attached to the head, a bolt extending through the hubs, ball bearings on the bolt, a sleeve mounted on said ball bearings, cutter disks mounted on said sleeve, and nuts on the outer ends of the bolt to draw the hubs toward each other to adjust said bearings.

2. In a dressing tool, a cutter cylinder and a bolt extending therethrough, adjustable bearings in the ends of said cutter cylinder, a head embodying alined hubs and slitted at right angles to said bolt to receive the bolt and a yoke connecting the hubs, and nuts on the ends of the bolt to draw the hubs toward each other to adjust the bearings.

3. In a dressing tool a cutter cylinder and a bolt extending therethrough, adjustable bearings in the ends of said cutter cylinder, a head embodying alined hubs to receive the bolt and a yoke connecting the hubs, and nuts on the ends of the bolt to draw the hubs toward each other to adjust the bearings, said head being formed with a two part cylindrical hood partly enclosing the cutter cylinder and having one part attached to each hub.

EDWARD N. PAGELSEN.